United States Patent Office 3,733,320
Patented May 15, 1973

3,733,320
ANTIBIOTIC PURIFICATION PROCESSES
Seemon H. Pines, Murray Hill, Norman C. Jamieson, Rahway, and Matthew A. Kozlowski, South River, N.J., assignors to Merck & Co., Inc., Rahway, N.J.
No Drawing. Filed Mar. 3, 1971, Ser. No. 120,706
Int. Cl. C07d 99/24
U.S. Cl. 260—243 C                              7 Claims

ABSTRACT OF THE DISCLOSURE

Fermentation broths or impure solutions containing 7-$\beta$-(D-5-amino-5-carboxyvaleramido)-3-(carbamoyloxymethyl)-7-methoxy-3-cephem-4-carboxylic acid, a substance having antibiotic activity against gram-negative and gram-positive microorganisms, are purified using (a) passage through a cationic exchange resin, (b) elution with a weak base, (c) passage through a weakly basic anionic exchange resin, (d) washing the column resin of stage c with a solution of dilute lower alkanoic acid, and (e) elution with a weak base or a phosphate buffer solution. The yield of product is greatly increased over prior purification processes.

BACKGROUND OF THE INVENTION

New and useful antibiotics are obtained by growing strains of a particular microorganism in suitable aqueous nutrient media under controlled conditions. Generally, before such antibiotics are of any practical value, they must be obtained in purified form substantially free of the other organic materials, as well as a number of inorganic compounds which are present in fermentation broths or concentrates thereof. The present invention is directed to the methods for recovering such an antibiotic in purified form.

SUMMARY

This invention relates to a multi-step method for recovering and purifying the novel antibiotic substance 7-$\beta$-(D-5-amino-5-carboxyvaleramido)-3-(carbamoyloxymethyl)-7-methoxy-3-cephem-4-carboxylic acid or salts thereof from aqueous solutions containing said antibiotic, by first contacting the fermentation broth in which the antibiotic was produced with a cation exchange resin to adsorb the antibiotic on such resin, and secondly, eluting the antibiotic from the resin adsorbate with a weak base, either an aqueous solution of an organic base or an inorganic base; thirdly, contacting the concentrated eluates with a weakly basic anionic exchange resin to adsorb the antibiotic on that resin; fourthly, washing the resin with a dilute solution of a lower alkanoic acid to remove impurities on the resin; and lastly, eluting the substantially pure antibiotic from the resin adsorbate using either a weak base or a buffer solution. The buffer solution can be any common aqueous buffers in the pH range of 4.5–9.5. For instance, phosphate, acetate, borate and citrate buffers can be used.

The order of the steps and the various reagents employed are critical in maximizing the yield. Each step will be described in greater detail hereinafter.

The antibiotic 7-$\beta$-(D-5-amino-5-carboxyvaleramido)-3-(carbamoyloxymethyl)-7-methoxy-3-cephem-4-carboxylic acid and its salts are effective in inhibiting the growth of various gram-negative and gram-positive microorganisms.

DESCRIPTION OF THE PREFERRED EMBODIMENTS

7-$\beta$-(D-5-amino-5-carboxyvaleramido)-3-(carbamoyloxymethyl)-7-methoxy-3-cephem-4-carboxylic acid having Formula I below is produced during the aerobic fermentation of suitable aqueous nutrient media, under controlled conditions, by a strain of Streptomyces lactamdurans capable of producing said compound, for instance by the strain on unrestricted permanent deposit in the culture collection of the Northern Utilization Research and Development Branch of the U.S. Department of Agriculture at Peoria, Ill., under accession number NRRL 3802, and is active in inhibiting growth of gram-positive and gram-negative microorganisms.

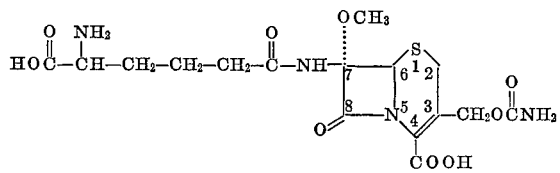

I

This compound is amphoteric with an apparent isoelectric point of about pH 3.5, and is most stable in solution at a pH range of about 1.5–9.0.

The amphoteric nature of this compound enables the use of both cationic and anionic ion exchange resins in the purification of the compound. However, due to the complexity of the crude fermentation broth, many other acidic and/or basic substances are present.

It is, therefore, an object of this invention to provide a purification process which will result in the isolation of the end product in high yield, using a small number of manipulative steps. It it a further object of this invention to isolate the end product in a form which can be used directly as an antibiotic, or in further chemical syntheses, without additional chemical modification.

By the present invention, it has been found that 7-$\beta$-(D-5-amino-5-carboxyvaleramido)-3-(carbamoyloxymethyl)-7-methoxy-3-cephem-4-carboxylic acid and salts thereof can be purified by the use of a multi-step purification process.

The starting material to be purified is in the form of the crude fermentation broth. Partially purified broths can also be used in this process; however, the advantage of this process is that the crude broth needs no preliminary treatment.

The broth containing the antibiotic is passed through a cationic ion exchange column. A typical resin is of the sulfonate type having a styrene-divinylbenzene matrix, for example, the polystyrene nuclear sulfonic acid resin Dowex 50 on the hydrogen cycle. We prefer to use Dowex 50X4, which means that the resin has 4% crosslinking. Other sulfonic acid resins commercially available can be used.

The broth is adjusted to pH values of below 7, about between 1.5 and 7 before contact with the resin. Preferably, the pH is adjusted to 2–4, by addition of small amounts of any inorganic or organic acid. The preferred acid is phosphoric, hydrochloric, or sulfuric acid, although this choice is obviously not critical.

The resultant resin adsorbate is then eluted with an aqueous solution of a weak base. The strength of the eluant is 0.1–2.0 M. The choice of base is not unduly critical, and can be an organic base such as pyridine, trialkylamine such as triethylamine, a picoline, triethanolamine, or a lutidine, or an aqueous solution of an organic or an inorganic base such as NH$_4$OH. The preferred eluant is a volatile organic base, since it can then be removed easily. Pyridine is especially preferred.

The eluates are collected in fractions, the size of the fraction depending upon the size of the column employed. The bioactivity of the eluates is measured by assaying the eluate by means of an assay using *Vibrio percolans* as the assay organism. The fractions containing most of the active material are then concentrated, generally in vacuo, to remove any volatile base and organic solvents. This purification using the cation exchange resin is, of course, not limited to fermentation broths but may be used with any impure solution of the compound of Formula I.

This concentrate is then adjusted to about pH 5-7, and passed through an anion exchange resin of the weakly basic type, such as a tertiary amine resin on an acrylic matrix or styrene-divinylbenzene matrix. An example of the former is IRA–68, in the chloride, formate, or acetate cycle. For this resin, the optimum pH was found to be between 6–7, although the pH is not unduly critical.

The resultant resin adsorbate is then "washed" with a dilute aqueous solution of a lower alkanoic acid. By the term lower alkanoic acid is meant preferably an acid having 1–5 carbon atoms. The preferred species is acetic acid. Although we do not wish to be bound by theory, the "washing step" creates a competitition for the basic sites on the resin. The less acidic substances which are impurities of the antibiotic product are removed by this acid wash step; but, surprisingly, the basic antibiotic remains adsorbed on the resin. Therefore, this adsorption and washing in combination greatly increase the purity of the end product.

We have found that the aqueous solution of the lower alkanoic acid is operable between 0.1 and 1.0 M, and is preferably about 0.5–0.75 M. The total volume of the acid "wash" is, of course, a function of the column size and can be determined experimentally. For example, we have found that five column volumes removes 90% of impurities, with a loss of less than 6% of active substance. From 3–10 column volumes of acid wash can operably be employed.

The "washed" resin adsorbate is then eluted with a number of substances satisfactorily. A weak organic base, or salt thereof, such as pyridine or pyridine hydrochloride, in aqueous solution, is one preferred method.

Another eluant is an aqueous inorganic phosphate buffer at a pH of about 8.

The eluate fractions containing the active material have been identified by the assay described above. Generally, most of the activity is recovered in eluate fractions 1–7, and an even more narrow range is 2–5.

The purified antibiotic can then be recovered from the eluant such as by evaporation, but can be further treated chemically to form antibiotically active chemical derivatives.

The antibiotic compound of Formula I above and its salts demonstrate resistance not only to penicillinase but to the cephalosporinases as well and exhibit an enhanced activity against gram-negative microorganisms. Unlike cephalosporin C which has a relatively low antibacterial activity, the products of this invention exhibit a significant in vivo gram-negative effect with a potency which, in general, is greater than cephalothin. This activity includes effectiveness in vivo on *Proteus morganii* and, in addition, an effectiveness against the following gram-negative bacteria: *Escherichia coli, Proteus vulgaris, Proteus mirabilis, Salmonella schottmuelleri, Klebsciella pneumoniae* AD, *Klebsiella pneumoniae* B, and *Paracolobactrum arizoniae*.

Bioassays for this antibiotic are run by a disc-plate procedure using 0.5 inch filter paper discs. The assay plates are prepared using Difco nutrient agar plus 2.0 g./l. Difco yeast extract at 10 ml. per plate. An overnight growth of the assay organism, *Vibrio percolans* ATCC 8461 is diluted in sterile saline solution to a suspension having 40% transmittance at a wave length of 660 m$\mu$. This suspension is added at 20 ml./liter of medium prior to pouring the plates.

The assay plates are held at 4° C. until used (5 day maximum). Following the application of the antibiotic-saturated assay discs the plates are incubated at 28° C. for a period of from 8 to 24 hours. Zones of inhibition are read as mm. diameter. They are used to determine relative potencies or, when compared with a purified reference standard, the potency in $\mu$g./ml.

7 - $\beta$-(D-5-amino-5-carboxyvaleramido)-3-(carbamoyloxymethyl) - 7 - methoxy-3-cephem-4-carboxylic acid is produced during the aerobic fermentation of suitable aqueous nutrient mediums under controlled conditions via the inoculation with the organism *Streptomyces lactamdurans* NRRL 3802. Aqueous medium, such as those employed for the production of other antibiotics are suitable for producing the antibiotic 7-$\beta$-(D-amino-5-carboxyvaleramido) - 3 - (carbamoyloxymethyl) - 7-methoxy-3-cephem-4-carboxylic acid. Such mediums contain sources of carbon and nitrogen assimilable by the microorganism and inorganic salts.

In general, carbohydrates such as sugars, for example, glucose, arabinose, maltose, raffinose, xylose, mannitol and the like and starches such as grains, for example, oats, rye, corn starch, corn meal and the like can be used either alone or in combination as sources of assimilable carbon in the nutrient medium. The exact quantity of the carbohydrate source or sources utilized in the medium depend in part upon the other ingredients of the medium but, in general, the amount of carbohydrate usually varies between about 1% and 6% by weight of the medium. These carbon sources can be used individually or several such carbon sources may be combined in the medium. In general any proteinaceous material may be used as a nitrogen source in the fermentation process. Suitable nitrogen sources include, for example, yeast hydrolysates, amber yeast, soybean meal, hydrolysates or casein, corn steep liquor, distilled solubles or tomato paste and the like. The sources of nitrogen, either alone or in combination, are used in amounts ranging from about 0.2 to 6% by weight of the aqueous medium.

The fermentation is carried out at temperatures ranging from about 20° C. to 37° C.; however, for optimum results it is preferable to conduct the fermentation at temperatures of from about 24° C. to 32° C. The pH of the nutrient mediums suitable for growing the *Streptomyces lactamdurans* culture and producing the antibiotic should be in the range of from about 6.0 to 8.0.

The following examples are for the purpose of illustration and not by way of limitation.

EXAMPLE 1

Step A: Fermentation

A lyophilized tube of *Streptomyces lactamdurans* culture (NRRL 3802) was used to inoculate 50 ml. of sterile Medium I in a baffled 200 ml. Erlenmeyer flask.

Medium I

| | | |
|---|---|---|
| Yeast autoylsate (ardamine) | g | 10.0 |
| Glucose | g | 10.0 |
| Phosphate buffer | ml | 2.0 |
| MgSO$_2$·7H$_2$O | g | 0.05 |
| Distilled water pH 6.5 | ml | 1000.0 |
| Phosphate buffer: | | |
| KH$_2$PO$_4$ | g | 91.0 |
| Na$_2$HPO$_4$ | g | 95.0 |
| Distilled water | ml | 1000.0 |

The inoculated flask was then placed on a 220 r.p.m. rotary shaker with a two inch throw and incubated for 72 hours at 28° C.

Five ml. aliquots (10% inoculum) of this growth were then transferred, using sterile pipettes, to four second-stage seed flasks of the same size and containing the same medium as described and these flasks were then shaken in the manner indicated above. The second-stage seed flasks were then pooled asceptically into one flask and used to inoculate 11 two-liter baffled Erlenmeyer flasks, each containing 350 ml. of Medium II with 2–3% inoculum using sterile pipettes. The Medium II has the following composition:

Medium II

| | |
|---|---|
| Amber yeast No. 300 _____ g__ | 10.0 |
| Distiller's solubles _____ g__ | 20.0 |
| Dextrose _____ g__ | 10.0 |
| Distilled water pH 7.0 _____ ml__ | 1000.0 |

The production flasks were then shaken at 28° C. on a 145 r.p.m. shaker with a two inch throw for four days. At the end of the incubation period the contents of 20 such flasks were combined and a sample was centrifuged to remove the mycelium.

Step B: Adsorption on a cation exchange resin

A column of Dowex 50X4 resin, (a strongly acidic cation exchange resin of the sulfonate type having a styrene-divinylbenzene matrix) on the hydrogen cycle, 103 cm. high and 12.44 cm. in diameter (containing 480 ml. resin) was backwashed to loosen and remove fines.

The broth prepared in Step A is filtered. The activity of solids is 60–100 units/mg.

Five liters (ca. 10 column volumes) of the filtered broth adjusted to pH 2.5 was pumped through the column of resin at about 60 ml./min. and the spent broth was collected. After washing with one liter of water, the column was ready for elution.

Step C: Elution

The eluant is 0.5 M pyridine in water. The pyridine solution was passed through the column at 40 ml./min., and 100 ml. samples were collected. Those fractions containing the biologically active Medium I were combined. 94% of the biological activity was recovered in the active fractions.

The eluate contained the pyridinium salt of 7-β-(D-5-amino-5-carboxyvaleramido) - 3-(carbamoyloxymethyl)-7-methoxy-3-cephem-4-carboxylic acid. The combined cuts were concentrated on a rotary evaporator to about 100 ml. A brown solid precipitate is removed by filtration and the filtrate and washings reconcentrated to about 30 ml. The pH was adjusted from about 4 to pH 7 with 2.5 N (3 ml.) of NaOH, and the volume made up to 100 ml.

Step D: Adsorption on a weakly basic anion exchange resin

A 250 ml. column of IRA–68, a weakly basic tertiary amine resin on an acrylic matrix was converted to its acetate form. The concentrate prepared in Step C was passed through the column at a rate of 10 ml./min. The column was washed with 250 ml. of water and then with 1250 ml. of 0.5 M acetic acid.

Step E: Elution with pyridine

The column was then washed with 250 ml. of water and then eluted with 0.5 M pyridine. The first five column volumes contained about 70% of the biological activity. When they were freeze dried, there was obtained 325 mg. of a light tan solid which was identified as the pyridine salt of 7-β-(D-5-amino-5-carboxyvaleramido)-3-(carbamoyloxymethyl) - 7 - methoxy-3-cephem-4-carboxylic acid having an activity of 5400 units/mg.

EXAMPLE 2

Steps A through D of Example 1 were performed substantially as described. The last elution Step E uses a phosphate buffer eluant instead of the pyridine eluant of Example 1.

The phosphate buffer was prepared by dissolving 14.2 g. $Na_2HPO_4$ in 100 ml. water (a) and 13.2 g. $KH_2PO_4$ in 100 ml. water (b). These are molar solutions. 75 ml. (a) and 5 ml. (b) were mixed and diluted to 1600 ml. to give about 0.05 M phosphate buffer of pH 8.

The IRA–68 column was then eluted with the above phosphate buffer. About 73% of the biological activity was found in 4 column volumes of eluate. This biological activity is due to the presence of 7-β-(D-5-amino-5-carboxyvaleramido)-3-(carbamoyloxymethyl) - 7 - methoxy-3-cephem-4-carboxylic acid.

What is claimed is:

1. The process for recovering the antibiotic 7-β-(D-5-amino-5-carboxyvaleramido) - 3-(carbamoyloxymethyl)-7-methoxy-3-cephem-4-carboxylic acid or a salt thereof from impure aqueous solutions containing said antibiotic which comprises (1) passing a fermentation broth or a solution containing said antibiotic through an acidic cationic exchange resin; (2) eluting the resin adsorbate with a weak base; (3) passing the eluates through a weakly basic anion exchange resin; (4) washing the absorbed resin with an aqueous dilute solution of a lower alkanoic acid; (5) eluting the adsorbed resin with either a solution of weak base eluant or a buffer; and (6) collecting the eluates, combining the active fractions, and removing the solvents whereby the product is obtained.

2. The process of claim 1 wherein the anion exchange resin is composed of tertiary amine exchange groups attached to an acrylic polymer lattice.

3. The process of claim 1 wherein the cation exchange resin is composed of nuclear sulfonic acid exchange groups attached to a styrene-divinylbenzene polymer lattice.

4. The process of claim 1 wherein the weak base eluting solution of step (2) is aqueous pyridine.

5. The process of claim 1 wherein the lower alkanoic acid is acetic acid.

6. The process of claim 1 wherein the weak base eluant of step (5) is pyridine.

7. The process of claim 1 wherein the eluant of step (5) is an aqueous phosphate buffer.

References Cited

UNITED STATES PATENTS 3,467,654   9/1969   McCormick _____ 260—243 C

NICHOLAS S. RIZZO, Primary Examiner

U.S. Cl. X.R.

424—246